June 29, 1937.  B. R. McCONNELL  2,085,111
JACK
Filed March 8, 1935  2 Sheets-Sheet 1
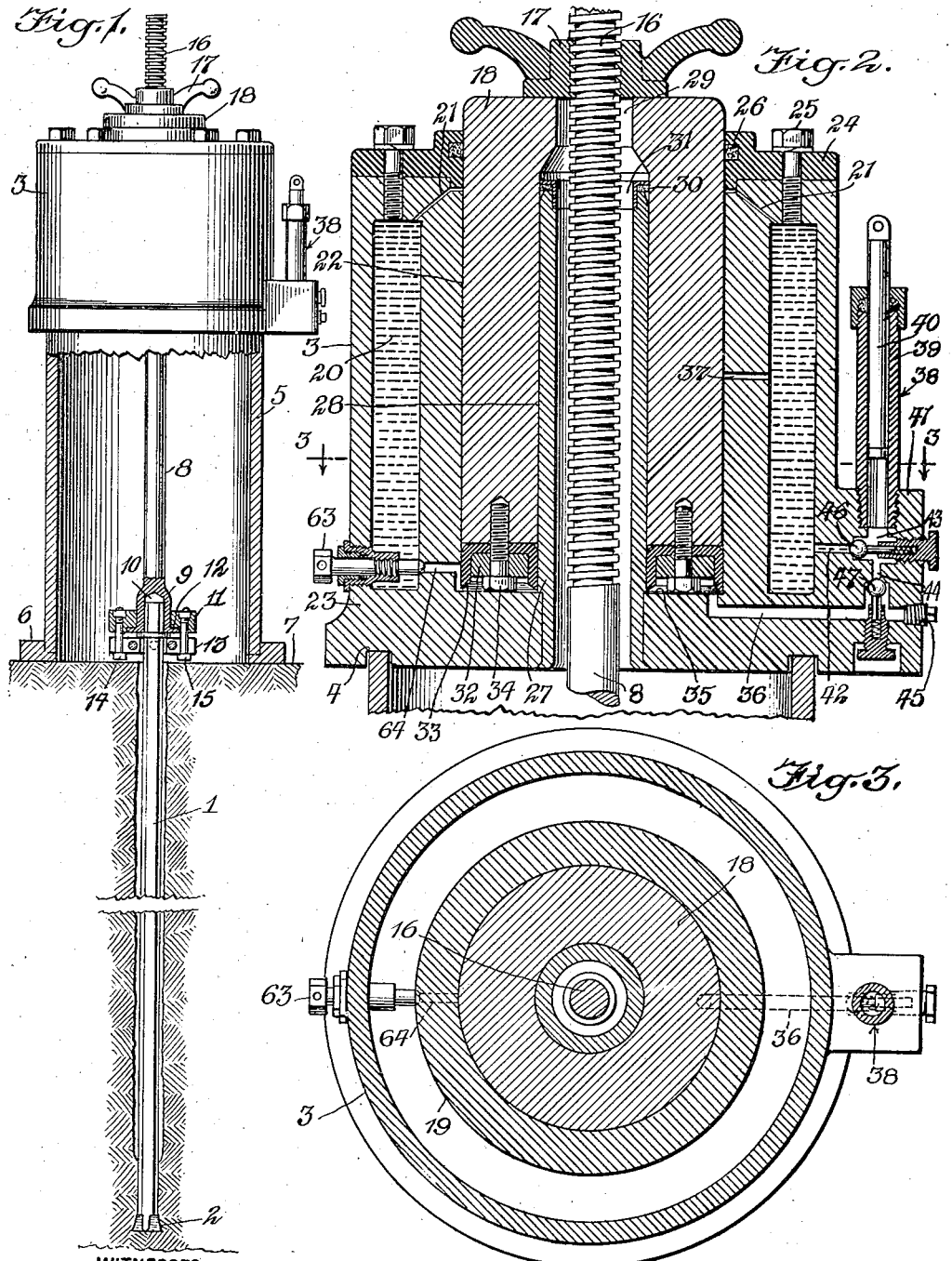
WITNESSES
INVENTOR
B. R. McConnell
BY
ATTORNEYS June 29, 1937.  B. R. McCONNELL  2,085,111
JACK
Filed March 8, 1935  2 Sheets-Sheet 2
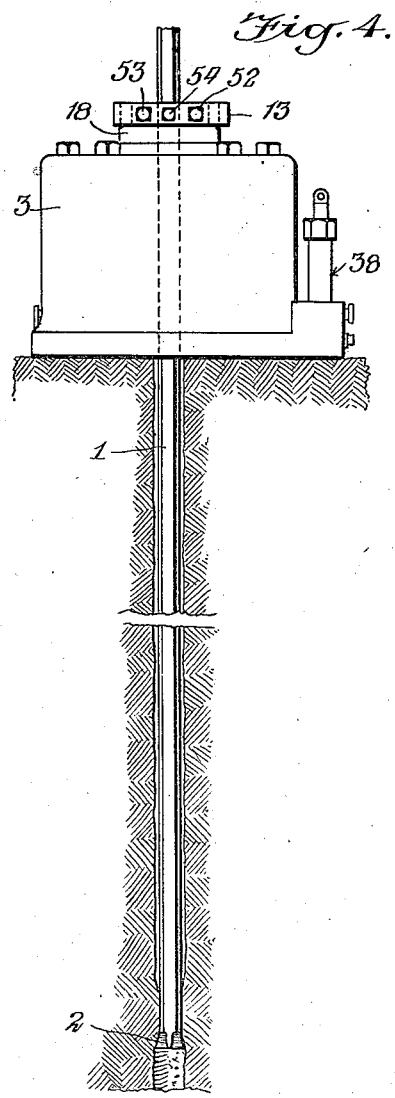
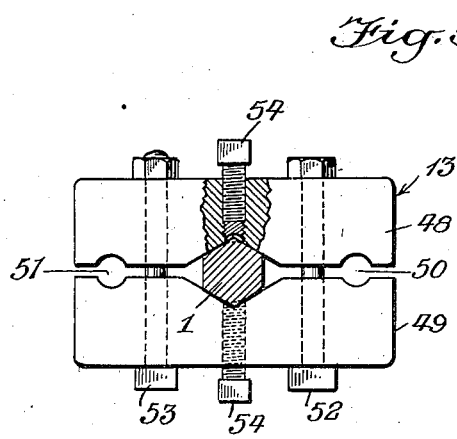
WITNESSES
INVENTOR
B. R. McConnell
BY
ATTORNEYS Patented June 29, 1937

2,085,111

UNITED STATES PATENT OFFICE 2,085,111

JACK

Benjamin R. McConnell, Waco, Tex., assignor to Herbert Clyde McConnell, Port Arthur, Tex.

Application March 8, 1935, Serial No. 10,114

3 Claims. (Cl. 254—30)

This invention relates to jacks and particularly to an improved hydraulic jack which may be used for many purposes but particularly for removing drills, pipes, and the like, which may become stuck.

Another object is to provide an improved hydraulic jack for a rock drill, pipe, or other object, wherein the pulling action is from the center of the jack and also wherein the drill, pipe, or the like, or an extension thereof, extends through the jack.

An additional object is to provide an improved construction of jack for pulling drills, pipes, and the like, wherein after the jack has been actuated for a short distance it may be released from the drill and the drill held in its elevated position and the jack moved to its former position for a second operation so as to give successive pulls on a drill, pipe, or the like, without allowing the drill or pipe any retrograde movement.

In the accompanying drawings—

Figure 1 is a view partly in elevation and partly in section showing a jack and attachment therefor disclosing an embodiment of the invention;

Fig. 2 is a vertical sectional view through the upper part of Fig. 1, and illustrating the construction of the jack and how the hydraulic action takes place;

Fig. 3 is a sectional view through Fig. 2 on the line 3—3;

Fig. 4 is a side view of the jack illustrated in Figs. 1 and 2, positioned to engage and pull a drill, the supporting tubular member and associated parts illustrated in Figs. 1 and 2 being eliminated;

Fig. 5 is a top plan view with certain parts in section illustrating the clamp shown in Fig. 4.

Referring to the accompanying drawings by numerals, 1 indicates a drill of the usual kind, the same being hexagonal in cross section and having the usual cutting teeth 2 at the end. When drilling in the customary way, usually an air rivet gun is used to strike the drill in order not to cause the lower end of the drill to chip away the stone. During this operation the drill bounces around in the hole. It will be understood that the drill shank has a hole from one end to the other and after the driller has hammered the drill for a while he stops the hammering operation and blows air from the gun to the bottom of the hole through the drill so as to blow out the dust and small chips of stone. After this blowing-out operation the driller continues the hammering operation. When the drill strikes a damp place in the stone the dust and chips of stone will be moist and will not blow out of the hole but will blow partly upwardly through the hole and then run back downwardly, and air blowing will cause this mixture to coagulate or cement together and choke the hole so that the foot of the drill which is more or less larger than the stem cannot be pulled out of the hole by reason of this cemented or coagulated ground stone and water. When this occurs some kind of pulling apparatus must be applied in order to remove the drill.

In the present invention an improved jack has been provided which will remove the drill 1, or a pipe from a well, or other article. As shown in Fig. 1, 3 indicates the jack, which is provided preferably with an annular groove 4 (Fig. 2) and in this groove the upper end of a tube 5 is fitted, the lower end being held or otherwise secured to a stiffening and engaging ring 6 which forms a base adapted to rest on the surface 7. This arrangement is used where a part of the drill 1 extends only a short distance beyond the surface 7. Where the drill extends an appreciable distance beyond the surface 7, the arrangement shown in Fig. 4 is used, namely, the jack 3 is positioned to rest on the surface 7 and the upper part of the drill extends through the jack. As shown in Fig. 3 there is provided a rod 8, which acts as an extension of the drill 1, said rod being enlarged at 9 and formed with a chamber 10 for receiving the upper end of the drill 1. A supporting ring 11 is mounted on the enlargement 9 and is engaged and supported by an annular flange 12. If desired, the ring 11 could be brazed, welded, or otherwise secured to the enlargement 9. A clamp 13 shown in detail in Fig. 5 and more fully hereinafter described is caused to clamp the upper end portion of drill 1 and is connected to the ring 11 by suitable bolts 14 and 15. The upper part of the rod 8 is provided with threads 16 for receiving the wing nut 17, whereby the rod may be brought under tension and the various parts caused to assume the positions shown in Fig. 2. It might be possible to pull the drill 1 by merely rotating the nut 17, but this is a slow process and ordinarily is not carried out. However, the base of nut 17 rests upon a plunger 18 forming part of jack 3. This plunger slides back and forth within a casing 19, which casing is preferably provided with an annular chamber 20 for the reception of oil or other liquid used in the jack. A number of relief passageways 21 extend from the upper end of the chamber 20 to the inner surface of the casing 19. This inner surface really forms what may be termed a bore 22, and slidingly fits the plunger 18 as the same moves. The casing 19 is preferably integral with a base 23, but at the upper end a removable top or cover 24 is provided and held in place by any desired number of screws 25. An annular packing 26 is provided in the cover 24, said packing being waste or other desired material, which prevents dirt or dust from entering between the plunger and the casing 19. Arranged centrally within the bore 22 is a tubular member 27, rigidly secured to the base 23 by riveting, welding, or the like. The exterior surface of this tubular member 28 fits the bore 28 of the plunger 18, which plunger has a closed upper end except for the central opening 29 through which the rod 8 extends, or the drill 1 extends if the same is sufficiently long. A packing 30 is carried by the upper end of the tubular member 27 and is held in place by a suitable ring 31, so as to prevent dust from entering the space between the plunger 18 and the tube 27.

From the description just made it will be observed that the casing 19 and the tube 27 are either integral or rigidly secured to the base 23 while the plunger 18 is adapted to move toward and from the base 23 when the device is in operation. The plunger 18 at the lower end really acts as a piston and is provided with an annular washer 33 held in place by an annular ring 32. The ring 32 is clamped in place by any desired number of screws 34.

When the parts are in the position shown in Fig. 2, the jack is in its constricted or retracted position. Oil or other liquid is forced into the chamber 35 through a passageway 36 and acts on the washer 32 and associated parts as well as on the base 23, whereupon the plunger 18 will begin to move upwardly or rather away from the base 23. As shown in Fig. 2, a small passageway or vent 37 is arranged intermediate the height of the casing 19 so that when the washer 32 reaches this point the oil or other liquid will move back into the chamber 20 in case the pump 38 continues to function. From Fig. 2 it will be observed that the pump 38 comprises a cylinder 39 and a piston 40 which may be operated by any desired means, said cylinder being screwed into an enlargement 41 forming preferably an integral extension of casing 19. It will also be noted from Fig. 2 that there is provided a passageway 42 leading to a small chamber 43 and a second passageway 44 leading from chamber 43 to passageway 36. A plug 45 is arranged at the outer end of passageway 36 so as to normally close this passageway at this point. Spring-pressed ball valves 46 and 47 normally close the passageways 42 and 44, said valves operating in opposite directions. When the piston 40 is moved upwardly, the valve 47 will remain seated but liquid will flow from the chamber 20 into chamber 43 and into the cylinder 39. Upon the return or downward stroke of the piston 40, the oil will cause the valve 46 to quickly close and remain closed. At the same time, the oil will pass to valve 47 and open the same, after which it will flow through the passageway 36 into chamber 35 for raising the plunger 18 and anything connected therewith.

When the parts are rigged up as shown in Fig. 1 and the plunger 18 is moved upwardly, it will press against the nut 17 and will pull upwardly on rod 8, which in turn will pull upwardly on the drill 1 for moving the same out of the drilled hole. If the drill 1 projects sufficiently far out of the drilled hole to extend through the jack, as shown in Fig. 4, the nut 17, rod 8 and associated parts will not be necessary, though the clamp 13 will be necessary. As shown in Fig. 5, the clamp 13 is provided with blocks 48 and 49 having notches resulting in comparatively round holes 50 and 51 for accommodating the bolts 14 and 15. Bolts 52 and 53 act to pull the blocks 48 and 49 toward each other and thereby to clamp them against the drill 1. To augment this clamping action there is provided a pair of set screws 54 positioned to press against one of the corners of the drill. When it is screwed down tightly, the set screws are not utilized, but if it is found that the drill is sliding through the clamp, these set screws are tightened up as much as possible so as to add to the clamping action.

After the plunger 18 has been moved upwardly to its fullest extent and it is desired to return the same to its lower position, as shown in Fig. 2, the valve 63 (Fig. 2) is opened and the liquid in chamber 35 will pass through the passageway 64 back into the chamber 20 so that it may be used again.

I claim:

1. A hydraulic jack, comprising a body formed with a base and having a centrally positioned passageway extending entirely therethrough, said body being also formed with three concentrically positioned tubular members upstanding from said base, the two outer tubular members being connected together at both ends to form a liquid reservoir, the inner of said tubular members with part of said base and the centrally positioned tubular member forming an annular chamber open at one end, a plunger annular in cross section fitted to slide in said chamber, said plunger being open at both ends, a pump carried by said base, said base being provided with an outlet from said reservoir to the pump and an inlet to said chamber extending from the pump, the inner of said tubular members being provided with a vent passageway extending from the lower end of said chamber into said reservoir, and a manually actuated vent valve for controlling the flow of liquid through said vent passageway.

2. A hydraulic jack, comprising a body having a substantially flat base provided with a pair of concentrically positioned tubular upstanding members connected together at the top for forming an annular reservoir, said base being also provided with a centrally positioned aperture and an integral enlargement adjacent the outer upstanding member, a plurality of check valves arranged in said enlargement, said base having a passageway extending from said check valves into said reservoir and a central passageway extending to a position interiorly of the inner of said upstanding tubular members, a pump carried by said enlargement functioning to draw liquid from one of said passageways and to discharge the same through the other passageway, an inner tubular member having one end fitting into the central aperture in said base, said inner tubular member extending to a position near the upper ends of said upstanding tubular members, an annular plunger fitting around said inner tubular member, and means for venting the space normally occupied by said plunger so that fluid may flow into said reservoir, said means including a manually controlled valve, the inner upstanding member being provided with a passageway intermediate its height presenting a vent between the chamber occupied by said plunger and said reservoir whereby when said pump has forced liquid into said chamber until the plunger has risen to a point above the last-mentioned vent, the liquid will flow back into the reservoir and will not act to further raise the plunger.

3. A hydraulic jack comprising a casing having a base provided with a centrally positioned aperture and three spaced upstanding tubular members, the two outer tubular members being connected together at the top and bottom to form an annular liquid reservoir while the center tubular member and the inner member of said two outer tubular members form with said base an annular chamber open at one end, said center tubular member being open at both ends and registering with the aperture in said base, a plunger annular in cross section positioned to reciprocate in said annular chamber, means for removing liquid from said annular reservoir and forcing the same into said chamber for causing the plunger to move away from said base and means for venting said chamber into said annular reservoir, said opening in said base and said center tubular member permitting an article acted on by said plunger to extend entirely through the center of the jack.

BENJAMIN R. McCONNELL.